3,272,822
POLYCHLOROQUINACRIDONE PIGMENTS
Ronald L. Sweet, Westfield, N.J., assignor to E. I. du Pont de Nemours and Company, Wilmington, Del., a corporation of Delaware
No Drawing. Filed Oct. 15, 1963, Ser. No. 316,447
2 Claims. (Cl. 260—279)

This invention relates to new pigments of the quinacridone series and methods of producing the same, and more particularly, the yellowish-red to bluish-red polyhaloquinacridone pigments possessing excellent lightfastness and high tinctorial strength and to new yellow polychloroquinacridonequinones having similar excellent properties of lightfastness and tinctorial strength.

Symmetrical tetrahalosubstituted quinacridone pigments have been known for some time. These compounds are prepared by heating under non-oxidizing conditions a dialkyl tetrahalo-2,5-dianilino-3,6-dihydroterephthalate in an inert high boiling liquid to obtain the tetrahalo-substituted linear dihydroquinacridone which is subsequently oxidized to symmetrical tetrahaloquinacridone, and more fully described in U.S. Patent 2,821,530. These pigments are generally yellowish-red to orange in color. Dichloro- and dibromoquinacridones as well as unsubstituted quinacridones are also known and described in U.S. Patent 2,821,529 and vary in color from a yellowish-red to a bluish-red and violet. Generally speaking, those quinacridones known prior to this invention which possess the desired degree of lightfastness and high tinctorial strength have been in the bluish-red to violet color range whereas those in the yellowish-red to orange range have been deficient in lightfastness and not acceptable for many pigment uses. However, the new products, produced by the novel method of this invention, expand the color range of those quinacridone pigments that have excellent qualities of lightfastness, tinctorial strength and resistance to chemical agents to include the very yellowish-red to bluish-red and, in some cases extend the color range all the way to yellow colored pigments.

A chlorinated quinacridone has been described by Liebermann in Ann., 518, 251 (1935). The chlorination process involves a reaction between quinacridone and boiling antimony pentachloride in the presence of iodine. The product is described as decachloroquinacridone and the reported analysis, after purification and recrystallization (53.93% Cl vs. 54.01% theory) supports this conclusion. It is said to melt at 402°, to be practically insoluble in the usual organic solvents, to give an orange-yellow solution in concentrated $H_2SO_4$ and to dissolve in hot 5% alcoholic KOH from which it may be precipitated unchanged on dilution with water. The chlorine atoms are firmly bound. Direct experiments have generally confirmed these reported properties except for the absence of a clearcut melting point (turns brown at 290–330° C., turns reddish-brown at 370° C., and darkens on further heating) and a slightly lower Cl content (49% to 52.75% in different runs). Upon oxidation in bichromate solution there is no obvious change in appearance nor in infrared absorption spectrum and no loss in chlorine content. Additionally, the product exhibits two clearcut X-ray diffraction peaks at 25.3° and 25.8° (2θ with CuK alpha radiation) corresponding to interplanar spacings of 3.52 A. and 3.45 A. When tested as a pigment in admixture with zinc oxide, it exhibits a light yellow tint which shows almost complete failure after exposure for 72 hours in an Atlas "Fade-Ometer."

An object of this invention, therefore, is to provide novel halogenated quinacridone pigments in the yellowish-red to bluish-red color range that exhibit good color strength, a high degree of lightfastness and freedom from bleed in solvents and chemical agents. Another object of this invention is to provide novel halogenated quinacridonequinone yellow pigments that exhibit good color strength, a high degree of lightfastness and freedom from bleed in solvents and chemical agents. A further object of the invention is to provide a novel process that is efficient and practical for directly halogenating quinacridone and quinacridonequinone in order to prepare useful pigments. Other objects and advantages will appear in the following description of the invention.

The present invention involves the discovery that direct halogenation of quinacridone or quinacridonequinone can be performed with elemental chlorine and/or bromine in the presence of certain metal halide catalysts to produce new and useful pigments which are highly resistant to fading, possess a high tinctorial strength and do not bleed when contacted with various solvents and chemical agents.

When quinacridone is halogenated with elemental bromine or chlorine or mixtures thereof in the presence of specific metal halide catalysts the resulting product is a yellowish-red to bluish-red pigment having a halogen content within the range of from about 2 to about 10 halogen atoms per molecule. Under the conditions of the process when the halogenating agent is or contains chlorine, 1 to 2 chlorine atoms become attached to the central ring of the quinacridone structure in the 6 and 13 positions. It has further been found that when quinacridonequinone is directly halogenated in a like manner utilizing, for example, chlorine and certain metal halide catalysts a new yellow pigment is formed having excellent properties in regard to lightfastness, tinctorial strength and resistance to chemical agents.

The halogenating agents used in this process are selected from the group consisting of the free halogens chlorine or bromine, and certain unstable compounds that break up on heating to yield the elemental halogen, namely, sulfur dichloride, thionyl chloride and sulfonyl chloride or mixtures thereof. Optimum results have been obtained using sulfur dichloride as the halogenating agent. Combinations of the unstable halogen carrier, thionyl chloride and free bromine have been used effectively to produce the halogenated quinacridone pigments of this invention.

The metal halide catalysts that are employed in the halogenation process are anhydrous aluminum chloride, anhydrous aluminum bromide, ferric chloride, ferric bromide and mixtures thereof.

The new compounds obtained according to the process of the invention can be more fully described as polychloroquinacridonequinones having the structural formula:

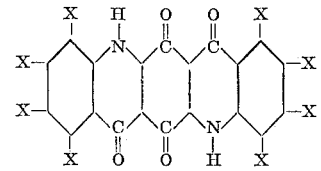

and polyhaloquinacridone having the structural formula:

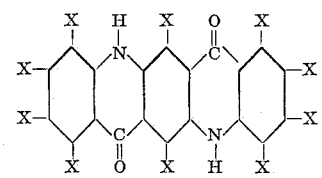

wherein x in each formula represents hydrogen, chlorine or bromine and said polyhaloquinacridone contains from more than about 2 to about 10 halogen atoms per molecule of which at least about 1 and not more than 2 halogen atoms are chlorine atoms attached to the central ring of the quinacridone structure. When polyhaloquinacridone is fully chlorinated to decachloroquinacridone the product is a yellowish-red pigment that exhibits superior properties of lightfastness not possessed by quinacridone pigments known in the art. The novel decachloroquinacridone is characterized by being slightly soluble in concentrated sulfuric acid to form a dark green solution, it shows no change on heating to about 370° C. but blackens at about 400° C. without melting, and exhibits a single X-ray diffraction peak with an interplanar spacing of 3.42 A.

For the practical operation of the process, it is also highly desirable to have present a carrier medium in which the quinacridone is dispersed and suspended prior to halogenation. The carrier medium may be an excess of the halogen containing liquid such as sulfur dichloride or thionyl chloride as described in some of the working examples set forth below. In another modification the carrier may be a molten eutectic mixture of the aluminum chloride catalyst and sodium chloride. A complex low-melting mixture formed from aluminum chloride and sulfur dioxide is also useful.

The conditions under which halogenation takes place may vary widely. In general, higher temperatures, up to about 180° C. and longer reaction times favor more complete halogenation. For example, a temperature of 180° C. for 4 hours gives substantially complete chlorination of quinacridone; conversely, lower temperatures, of the order of about 80° C. and reaction times of 2 to 3 hours result in a much lower chlorine content on the quinacridone structure. Co-halogenation of quinacridone by introducing both chlorine and bromine into the molecule can be accomplished. However, in such instances, it has been found that the vigorous preferred conditions for complete halogenation result in the preferential introduction of chlorine with, to a large extent, the exclusion of bromine even though it is present. On the other hand, the use of lower temperatures (e.g., 80°–120° C.) favors the introduction of bromine as does the use of the less vigorous halogen carrier, thionyl chloride. In order to overcome, at least in part, the tendency for lower temperatures to result in less total halogenation, it is convenient and partially effective to increase the reaction time to as much as 12 hours.

In a preferred embodiment of this invention, unsubstituted linear quinacridone is chlorinated by heating under pressure with sulfur dichloride in the presence of anhydrous $AlCl_3$. The introduction of elemental bromine to this reaction results in a product which contains both chlorine and bromine.

In an alternative procedure which may be preferred under some conditions, quinacridone is suspended in a molten mixture of $AlCl_3$ and $NaCl$ through which chlorine is passed.

The following examples illustrate the invention in detail. The term "parts" refers to measurements on a weight basis.

*Example 1*

15 parts of quinacridone (prepared as in U.S. 2,821,529 by the cyclization of dimethyl 2,5-dianilino-3,6-dihydroterephthalate to 6,13-dihydroquinacridone and the subsequent oxidation to quinacridone) is added to a mixture of 325 parts sulfur dichloride and 50 parts anhydrous aluminum chloride at 50° C. While stirring, the mixture is heated to 100° C. and held at this temperature for 1½ hours. The hot mixture is then poured in a thin stream into about 1000 parts of hot stirred water. After stirring for about 15 minutes, the solid is isolated by filtration and washing. It is purified by reslurrying in several volumes of hot 10% NaOh solution, filtered again, washed free of alkali and dried to give 26 parts of yellowish-red pigment of excellent lightfastness which contains 46.1% Cl, corresponding to an average of 7.3 atoms of chlorine per molecule of quinacridone ($QA\ Cl_{7.3}$). This compound dissolved in concentrated $H_2SO_4$ gives a bluish-green color.

*Example 2*

15 parts of quinacridone and 50 parts of anhydrous aluminum chloride are added to 330 parts of thionyl chloride in a suitable vessel equipped for agitation, for heating and for condensation and return of vaporized thionyl chloride. While stirring, the mixture is heated to 80° C. and held near that temperature for about 2½ hours. While still hot, it is drowned into water, filtered, extracted with strong alkali, filtered again, washed and dried to give a bluish-red product containing 28.4% chlorine which corresponds to an average of 3.4 chlorine atoms per molecule. This is a useful bluish-red quinacridone (especially after particle size reduction in a conventional manner) resistant to chemical reagents. The compound dissolved in concentrated sulfuric acid gives a green color. The product differs from prior art chlorinated quinacridones made through the use of chlorinated anilines in that some of the chlorine is removed by oxidation in a mixture of $CrO_3$, glacial acetic acid and water. Thus, a portion of the new product, when so oxidized gave a yellow chlorinated quinacridonequinone containing 16.4% chlorine corresponding to an average of 1.9 chlorine atoms in the molecule. On this basis, substantially half of the original chlorine must be in the 6 and 13 positions on the central benzene ring.

*Example 3*

327 parts of crude quinacridone is charged to a suitable autoclave (equipped for agitation under pressure, for heating and for venting of excess pressure) together with 327 parts of anhydrous aluminum chloride. 4,860 parts of sulfur dichloride is added to the autoclave which is then sealed and agitated while heating to 180° C. It is held for about 4 hours at 180° C. with pressure maintained at about 265 p.s.i. by venting excess pressure as required. At the end of the cycle, the autoclave is vented at atmospheric pressure and the sulfur chloride removed by passing through the autoclave a stream of chlorine gas while heating to above 65° C. which enables the volatile sulfur dichloride to vaporize. The resulting dry product is extracted with hot 10% NaOH solution as in Example I, filtered, washed and dried to recover 664 parts of a yellowish-red pigment of the following analysis:

Found: Percent C., 36.68, 36.31; percent H, 0.45, 0.38; percent N, 4.05, 4.08; percent Cl, 53.32. Calculated for decachloroquinacridone $C_{20}H_2N_2Cl_{10}$: percent C, 36.5; percent H, 0.31; percent N, 4.27; percent Cl, 54.0.

This analysis corresponds to a formula—$QA\ Cl_{9.7}$.

The product is very slightly soluble in concentrated sulfuric acid to a dark green solution. It shows no change on heating to about 370° C. where it begins to turn brown and then blackens without melting at about 400° C.

This product exhibits one strong X-ray diffraction peak at 26.0° $2\theta$. (Interplanar spacing of 3.42 A.) For practical use as a pigment, it is desirable to bring about particle size reduction by any convenient means. This may be done by milling in acetone (U.S. Patent 2,556,727), by milling in saturated aqueous slurries of finely crystalline inorganic salts (U.S. Patent 2,816,114), by milling with aluminum sulfate in the presence of a chlorinated hydrocarbon (U.S. Patent 3,030,370), by acid pasting and the like. When such a pigment is dispersed in a coating composition and extended with a white pigment, such as zinc oxide, it yields a yellowish-red tint which shows no significant change in color after 400 hours exposure in an Atlas "Fade-Ometer." A full shade alkyd enamel prepared from such a pigment shows excellent durability on exposure to the elements in Florida.

This compound was then compared chemically with the Liebermann compound noted and described above that showed a complete failure for lightfastness when extended in zinc oxide and tested for 72 hours. The product produced by the process described by Liebermann is characterized by the following physical and chemical properties. The compound turns brown on heating at 290–330° C., turned reddish-brown at 370° C., and then darkened on further heating. In addition, the compound exhibits two clear cut X-ray diffraction peaks at 25.3° and 25.8° ($2\theta$ with CuK alpha radiation) and gives an orange-yellow solution in concentrated sulfuric acid. Upon oxidation with bichromate solution there is no obvious change in appearance nor in infra-red absorption spectrum.

From the above data it can be seen that the Liebermann product and the product of Example 3 are substantially different chemical compounds.

*Example 4*

A. 100 parts of the decachloroquinacridone of Example 3 is added to 5600 parts of glacial acetic acid, and 260 parts of chromium trioxide in 1000 parts of water is added thereto slowly. The mixture is heated cautiously to the boil and maintained at the boil under reflux for about 5 hours. It is then filtered, washed acid free and dried to give 88 parts of an intense yellow pigment of the following analysis:

Found: percent C, 39.62, 39.86; percent H, 0.62, 0.86; percent N, 4.38, 4.31; percent Cl, 45.3. Calculated for octachloroquinacridonequinone: percent C, 38.9; percent H, 0.33; percent N, 4.54; percent Cl, 45.9.

This approximates an average chlorine content of 7.8 chlorine atoms per molecule. A solution of the compound in concentrated $H_2SO_4$ gives an orange color.

B. 164 parts of quinacridonequinone (obtained by reaction of anthranilic acid with benzoquinone and subsequent cyclization in sulfuric acid) is chlorinated with 2430 parts of sulfur chloride in the presence of 164 parts of $AlCl_3$ using the procedure described above in Example 3 to yield 265 parts of yellow pigment having a chlorine analysis of 43.8% and showing generally identical properties (including the infra-red spectrum and the color in concentrated $H_2SO_4$) with the product of Part A above.

This highly chlorinated octachloroquinacridonequinone obtained by oxidizing the decachloroquinacridone of Example 3 or by the direct chlorination of quinacridonequinone is a valuable yellow pigment that quite surprisingly possesses superior properties of lightfastness as compared to the unchlorinated quinacridonequinone.

*Example 5*

15 parts of quinacridone is added to a mixture of 49 parts of sulfur dichloride and 60 parts of anhydrous aluminum bromide in a suitable vessel. While stirring the mixture is heated to 120° C. and held at about 120° C. for 4 hours. After cooling, water is added to the mixture which is then extracted by boiling with dilute HCl and then, after filtering, is further extracted at the boil in dilute alkali. It is finally filtered, washed first with water and then with alcohol and dried to give a bluish-red pigment containing 5.09% chlorine and 31.5% bromine. A solution of the compound in concentrated $H_2SO_4$ gives a green color. This corresponds to an average of 0.7 chlorine atom and 1.9 bromine atoms per molecule. The chlorine is mostly removable by oxidation and is, hence, in the 6 or 13 position.

*Example 6*

A mixture of 327 parts quinacridone and 654 parts $AlCl_3$ is charged to an autoclave as used in Example 3 followed by 2150 parts thionyl chloride and 654 parts bromine. The autoclave is sealed and heated to 80° C. while stirring well. It is maintained at about 80° C. for 12 hours and the product recovered as shown in Example 3 to give 635 parts of a yellowish-red quinacridone pigment of good lightfastness which gives a greenish-blue solution in concentrated $H_2SO_4$.

The analysis of

| | Percent |
|---|---|
| C | 35.93 |
| H | 1.41 |
| N | 4.22 |
| Cl | 12.3, 11.6, 11.7 |
| Br | 41.7, 41.5, 41.3 | corresponds to an average of 2.12 atoms of chlorine and 3.35 atoms of bromine per molecule.

Upon oxidation with chormic acid as in Example 4A, the chlorine content is reduced to 3.98% or an average of 0.72 atom per molecule while the bromine content of 42.25% shows no change from about 3.34 atoms. It appears that chlorine preferentially enters the 6,13 positions but that bromine does not.

*Example 7*

327 parts of quinacridone and 654 parts of anhydrous aluminum chloride are charged to a suitable autoclave such as that described in Example 3 after which there is added in turn 2100 parts of sulfur dichloride and 327 parts of bromine. The autoclave is sealed, agitation started, and heated to 120° C., then held at 120° C. for 2 hours. After recovery of the product as described in Example 3, there was obtained 505 parts of a very yellow shade, red pigment of the following analysis:

| | Percent |
|---|---|
| C | 37.21 |
| H | 0.53 |
| N | 4.12 |
| Cl | 49.1 |
| Br | 2.50, 2.1 |

This corresponds to an average of 8.7 chlorine atoms and 0.18 bromine atom per molecule and gives a green solution in concentrated $H_2SO_4$.

After particle size reduction by milling with aluminum sulfate in the presence of tetrachloroethylene, the product gives coating compositions which are very yellow, strong and intense in comparison to the gamma phase of quinacridone (U.S. Patent 2,844,581), its most yellow form. Regardless of the method of finishing, the products show a strong X-ray diffraction ine at 26° $2\theta$ with three weak lines at 23.5°, 24.3° and 33.7°.

Oxidation with chromic acid as in Example 4A gives a yellow product in which the chlorine content is reduced to 43.55% which corresponds to an average of 7.4 atoms of chlorine per molecule showing again the significant removal from the 6,13 positions on oxidation.

*Example 8*

A mixture of 225 parts of anhydrous aluminum chloride, 55 parts sodium chloride and 30 parts quinacridone in a suitable vessel of resistant material is heated to about 150° C. whereupon the inorganic salts melt as a eutectic mixture which is then thoroughly stirred and chlorine gas is bubbled through the mixture at a vigorous rate for 1 hour, holding the temperature between 150° C. and 180° C. The hot mixture is then added slowly to a solution of 118 parts concentrated hydrochloric acid in 1000 parts of water. After stirring for a short time, the product is filtered, washed free of soluble salts and dried to give 47.5 parts of a red pigment which contains 37.7% chlorine and dissolves in concentrated $H_2SO_4$ to give a greenish-blue solution.

*Example 9*

A mixture of about 35% quinacridonequinone and 65% quinacridone is obtained by oxidizing 6,13-dihydroquinacridone with nitrobenzene-m-sodium sulfonate in an aqueous medium. 327 parts of the resulting maroon pigment, together with 327 parts of anhydrous $AlCl_3$ are suspended in about 480 parts of sulfur dichloride in an autoclave. This mixture is stirred and heated at 180° C. for 4 hours at a pressure of 265 p.s.i. as more fully described in Example 3 above. The product, as isolated from the mixture, consists of 653 parts of a bluish-red powder with 49.3% chlorine content which gives a green solution in concentrated $H_2SO_4$. Upon particle size reduction and dispersion in a suitable vehicle, there is obtained a violet coating composition of good lightfastness and high tinting strength.

*Example 10*

15 parts of quinacridone and 40 parts of $AlCl_3$ are added to 50 parts of thionyl chloride and 117 parts of bromine in a suitable vessel. The mixture is heated at 60° C. for 24 hours followed by the addition of 45 parts of bromine and heating at 60° C. for an additional 24 hours. The pigment is isolated by pouring the mixture into water, heating for ½ hour at the boil, filtering, washing and drying to give 34 parts of a yellowish-red pigment which, after purification by successive extractions in strong alkali and dilute acid contains, by analysis, 46.2% Br and 10.2% Cl which corresponds to an average of 4.03 atoms of Br and 1.99 atoms of Cl per molecule, 6,13-dichlorotetrabromoquinachridone. A solution of the compound dissolved in concentrated $H_2SO_4$ gives a green color.

*Example 11*

A product containing only bromine is obtained by heating at 60° C. 15 parts quinacridone with a mixture of 50 parts thionyl chloride, 80 parts anhydrous $AlBr_3$ and 45 parts bromine for 24 hours followed by the addition of 45 parts bromine and heating for another 24 hours. Recovery of the product in the conventional way yielded 21.6 parts of a bluish-red pigment containing about 32% Br and no chlorine corresponding to an average of about 1.84 bromine atoms per molecule. A solution of this pigment dissolved in concentrated $H_2SO_4$ gives a reddish-blue color. A coating composition containing this pigment extended with zinc oxide showed no fading after an exposure of 200 hours in the "Fade-Ometer."

Since the direct halogenation of an aromatic ring always produces a molecule of by-product gas (HCl or HBr) for each molecule of halogen consumed, there is a potential for pressure building up in a closed vessel such as an autoclave. Example 3 has specified that the pressure should not be in excess of about 265 p.s.i., and should be held at this point by venting. It is understood that similar precautions are necessary whenever a closed vessel is used.

It has been shown in the examples that the products of this invention from the direct halogenation of quinacridone may be readily oxidized by chromic acid to halogenated quinacridonequinones, always losing a significant amount of chlorine (but no bromine when it is present) in the process. Since the quinone oxygens are attached to the central ring in the 6 and 13 positions, the loss of chlorine is evidence that some of the chlorine always enters these positions on direct halogenation.

I claim:
1. Octachloroquinacridonequinone.
2. Decachloroquinacridone characterized by being slightly soluble in concentrated sulfuric acid to form a dark green solution, said compound shows no change on heating to about 370° C. but blackens at about 400° C. without melting and exhibits a single X-ray diffraction peak with an interplanar spacing of 3.42 A.

References Cited by the Examiner

FOREIGN PATENTS 140,134  12/1960  Russia.

OTHER REFERENCES

Fieser, "Natural Products Related to Phenanethrene," 3rd Ed., Reinhold, page 233 (1949).

Liebermann, Justus Liebig's Annalen, Vol. 518, pages 245–259 (1935).

Thomas, "Anhydrous Aluminum Chloride in Organic Chemistry," Reinhold, 1941, pp. 611–4, 693–4 relied upon.

References Cited by the Applicant

UNITED STATES PATENTS 2,821,529  1/1958  Struve.
2,821,530  1/1958  Struve.

ALEX MAZEL, *Primary Examiner.*

NICHOLAS S. RIZZO, *Examiner.*

DONALD G. DAUS, *Assistant Examiner.*